United States Patent [19]

Wehling

[11] 4,447,244
[45] May 8, 1984

[54] PROCESS FOR MASS-DYEING OF THERMOPLASTICS: POLYSTYRENE AND STYRENE COPOLYMERS WITH INDOLINE METHINE DYES

[75] Inventor: Bernhard Wehling, Cologne, Fed. Rep. of Germany

[73] Assignee: Bayer Aktiengesellschaft, Leverkusen, Fed. Rep. of Germany

[21] Appl. No.: 464,073

[22] Filed: Feb. 4, 1983

[30] Foreign Application Priority Data

Feb. 19, 1982 [DE] Fed. Rep. of Germany ....... 3206091

[51] Int. Cl.³ ............................ C08J 3/20; C08K 5/34
[52] U.S. Cl. ............................................. 8/514; 8/692
[58] Field of Search .................................... 8/514, 692

[56] References Cited

U.S. PATENT DOCUMENTS 2,840,443 6/1958 Smith ...................................... 8/659

FOREIGN PATENT DOCUMENTS 1569728 8/1972 Fed. Rep. of Germany .

*Primary Examiner*—A. Lionel Clingman
*Attorney, Agent, or Firm*—Sprung, Horn, Kramer & Woods

[57] ABSTRACT

Process for mass-dyeing of thermoplastics, characterized in that the dyestuffs used are of the formula

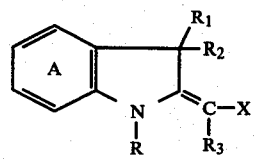

in which
X designates a radical

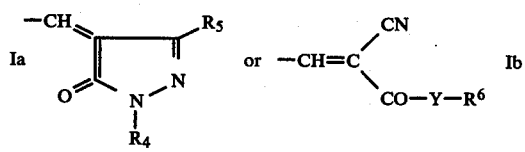

R designates hydrogen or alkyl,
$R_1$ and $R_2$ designate alkyl,
$R_3$ designates hydrogen, cyano, aroyl, alkoxycarbonyl, alkylcarbonyl or carbamoyl,
$R_4$ designates aryl,
$R_5$ designates alkyl, alkylcarbonyl, alkoxycarbonyl or aryl,
$R_6$ designates alkyl, aryl, aralkyl or aralkenyl, and
Y designates O or $NR_7$, with $R_7$ having the meaning hydrogen, alkyl, aralkyl or aryl, it being possible for the radicals which have been mentioned for $R_7$ and $R_1$-$R_7$ and which contain C—H or N—H bonds to be substituted, and wherein the ring A can carry 1, 2 or 3 substituents from the series comprising halogen, cyano, alkyl, alkoxy, alkylcarbonyl, alkoxycarbonyl, aralkoxycarbonyl, carbamoyl, sulphamoyl, alkylsulphonyl and arylsulphonyl, or can have a benzene ring fused to it, it being possible for the radicals which have been mentioned as substituents of the ring A and which contain C—H or N—H bonds to be substituted.

8 Claims, No Drawings

PROCESS FOR MASS-DYEING OF THERMOPLASTICS: POLYSTYRENE AND STYRENE COPOLYMERS WITH INDOLINE METHINE DYES

The invention relates to a process for mass-dyeing of thermoplastics, which is characterised in that the dyestuffs used are of the formula

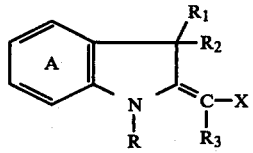
(I)

in which

X designates a radical

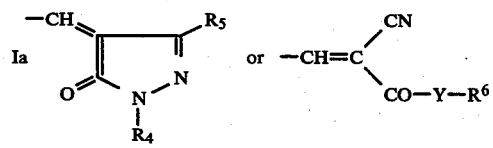

R designates hydrogen or alkyl, $R_1$ and $R_2$ designate alkyl, $R_3$ designates hydrogen, cyano, aroyl, alkoxycarbonyl, alkylcarbonyl or carbamoyl, $R_4$ designates aryl, $R_5$ designates alkyl, alkylcarbonyl, alkoxycarbonyl or aryl, $R_6$ designates alkyl, aryl, aralkyl or aralkenyl, and Y designates O or $NR_7$, with $R_7$ having the meaning hydrogen, alkyl, aralkyl or aryl, it being possible for the radicals which have been mentioned for $R_7$ and $R_1$–$R_7$ and which contain C—H or N—H bonds to be substituted, and wherein the ring A can carry 1, 2 or 3 substituents from the series comprising halogen, cyano, alkyl, alkoxy, alkylcarbonyl, alkoxycarbonyl, aralkoxycarbonyl, carbamoyl, sulphamoyl, alkylsulphonyl and arylsulphonyl, or can have a benzene ring fused to it, it being possible for the radicals which have been mentioned as substituents of the ring A and which contain C—H or N—H bonds to be substituted.

Compounds which are preferably employed in the process according to the invention are those of the formula

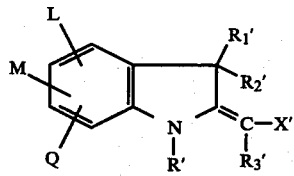
(II)

in which

X' represents

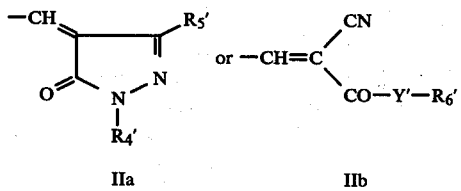

and

R' designates hydrogen, methyl or ethyl, $R_1'$ and $R_2'$ designate methyl or ethyl, $R_3'$ designates hydrogen, cyano, aroyl, in particular benzoyl and naphthoyl, alkoxycarbonyl, in particular ($C_1$–$C_4$-alkoxy)-carbonyl or carbamoyl, $R_4'$ designates phenyl which can be substituted by methyl, ethyl, methoxy, ethoxy or chlorine, $R_5'$ designates methyl, methoxycarbonyl or ethoxycarbonyl, or phenyl wich can be substituted by methyl and/or ethyl, $R_6'$ designates $C_1$–$C_4$-alkyl, phenyl, chlorophenyl or methylphenyl, or phenyl-$C_1$–$C_3$-alkyl which can be substituted in the phenyl nucleus by chlorine and/or methyl, or designates phenylallyl or phenoxyethyl, Y' designates O or $NR_7$, wherein $R_7'$ represents alkyl, in particular $C_1$–$C_4$-alkyl, or aralkyl, in particular phenyl-$C_1$–$C_3$-alkyl, L designates hydrogen, chlorine, cyano, methyl, ethyl, methoxy, ethoxy, methoxycarbonyl, ethoxycarbonyl or benzyloxycarbonyl, or sulphamoyl or carbamoyl which is optionally substituted by methyl, ethyl or phenyl, or designates methylsulphonyl or phenylsulphonyl, and M and Q designate hydrogen, methyl, ethyl, methoxy, ethoxy, chlorine or methoxycarbonyl, and two of the substituents L, M and Q together can form a fused benzene ring.

Of particular interest are dyestuffs of the formula II, in which

R' designates hydrogen or methyl, $R_1'$ and $R_2'$ designate methyl, $R_3'$ designates hydrogen, cyano or benzoyl, $R_4'$ designates phenyl which can be substituted by methyl, methoxy and/or chlorine, $R_5'$ designates methyl or methoxycarbonyl, L designates hydrogen, methoxycarbonyl, cyano, methoxy or chlorine, M and Q designate hydrogen, Y' designates O, and $R_6'$ designates $C_1$–$C_4$-alkyl, phenyl, chlorophenyl or methylphenyl, or phenyl-$C_1$–$C_3$-alkyl, the phenyl radical of which can be substituted by chlorine or methyl, or designates phenoxyethyl.

The compounds

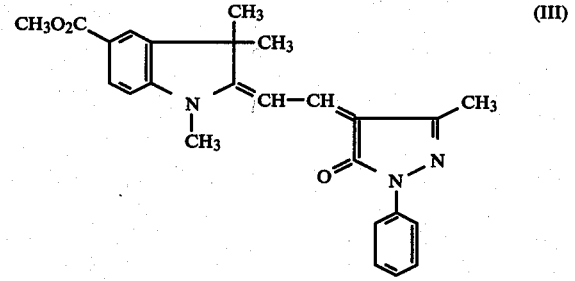
(III)

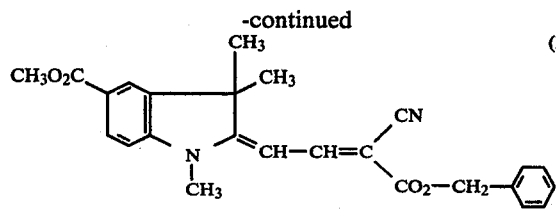

are very particularly preferably employed in the process according to the invention.

N,N-dialkylsubstituted enamines with the appropriate 2-methyleneindolines (see German Auslegeschrift No. 1,154,894), or by reaction of 2-methyleneindoline-ω-aldehydes with the appropriate pyrazolone (see German Auslegeschrift No. 1,172,487). The compounds of the formula Ib are obtained by condensation of the 2-methyleneindoline-ω-aldehydes with the appropriate cyanoacetates (see German Auslegeschrift No. 1,172,387 or 1,569,728).

Some particularly suitable compounds are listed in Tables 1 and 2 which follow.

TABLE 1

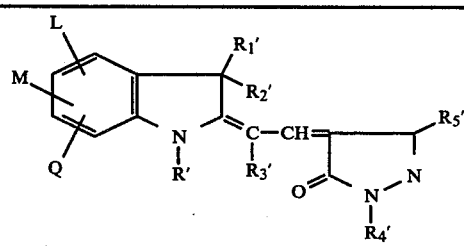

IIa

| Compound | L | M | Q | R' | $R_1'$ | $R_2'$ | $R_3'$ | $R_4'$ | $R_5'$ | Shade of the polystyrene dyeing |
|---|---|---|---|---|---|---|---|---|---|---|
| 1 | H | H | H | $CH_3$ | $CH_3$ | $CH_3$ | H | $C_6H_5$ | $CH_3$ | orange |
| 2 | 5-$CH_3O$ | H | H | $CH_3$ | $CH_3$ | $CH_3$ | H | $C_6H_5$ | $CH_3$ | orange |
| 3 | 5-$CH_3O_2C$ | H | H | $CH_3$ | $CH_3$ | $CH_3$ | H | $C_6H_5$ | $CH_3$ | orange |
| 4 | 5-Cl | H | H | $CH_3$ | $CH_3$ | $CH_3$ | H | $C_6H_5$ | $CH_3$ | orange |
| 5 | H | H | H | $CH_3$ | $CH_3$ | $CH_3$ | CN | $C_6H_5$ | $CH_3$ | orange |
| 6 | 5-$CH_3O$ | H | H | $CH_3$ | $CH_3$ | $CH_3$ | CN | $C_6H_5$ | $CH_3$ | orange |
| 7 | 5-$CH_3O_2C$ | H | H | $CH_3$ | $CH_3$ | $CH_3$ | CN | $C_6H_5$ | $CH_3$ | orange |
| 8 | 5-Cl | H | H | $CH_3$ | $CH_3$ | $CH_3$ | CN | $C_6H_5$ | $CH_3$ | orange |
| 9 | H | H | H | $CH_3$ | $CH_3$ | $CH_3$ | H | $C_6H_5$ | $CO_2CH_3$ | yellowish red |
| 10 | 5-$CH_3O$ | H | H | $CH_3$ | $CH_3$ | $CH_3$ | H | $C_6H_5$ | $CO_2CH_3$ | yellowish red |
| 11 | 5-$CH_3O_2C$ | H | H | $CH_3$ | $CH_3$ | $CH_3$ | H | $C_6H_5$ | $CO_2CH_3$ | yellowish red |
| 12 | 5-Cl | H | H | $CH_3$ | $CH_3$ | $CH_3$ | H | $C_6H_5$ | $CO_2CH_3$ | yellowish red |
| 13 | H | H | H | $CH_3$ | $CH_3$ | $CH_3$ | H | p-tolyl | $CH_3$ | orange |
| 14 | 5-$CH_3O$ | H | H | $CH_3$ | $CH_3$ | $CH_3$ | H | p-tolyl | $CH_3$ | orange |
| 15 | 5-$CH_3O_2C$ | H | H | $CH_3$ | $CH_3$ | $CH_3$ | H | p-tolyl | $CH_3$ | orange |
| 16 | 5-Cl | H | H | $CH_3$ | $CH_3$ | $CH_3$ | H | p-tolyl | $CH_3$ | orange |

The methine dyestuffs to be used according to the invention represent known compounds. The dyestuffs of the general formula Ia are advantageously prepared by condensation of pyrazolone-4-aldehydes of their The dyestuffs listed in Table 2 below dye polystyrene yellow when used in customary mass-dyeing processes.

TABLE 2

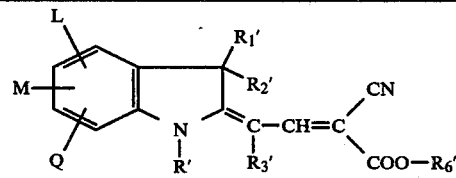

| Compound | L | M | Q | R' | $R_1'$ | $R_2'$ | $R_3'$ | $R_6'$ |
|---|---|---|---|---|---|---|---|---|
| 17 | H | H | H | $CH_3$ | $CH_3$ | $CH_3$ | H | $C_2H_5$ |
| 18 | 5-$CH_3O$ | H | H | $CH_3$ | $CH_3$ | $CH_3$ | H | $C_2H_5$ |
| 19 | 5-$CH_3O_2C$ | H | H | $CH_3$ | $CH_3$ | $CH_3$ | H | $C_2H_5$ |
| 20 | 5-Cl | H | H | $CH_3$ | $CH_3$ | $CH_3$ | H | $C_2H_5$ |
| 21 | H | H | H | $CH_3$ | $CH_3$ | $CH_3$ | H | $CH_2-C_6H_5$ |
| 22 | 5-$CH_3O$ | H | H | $CH_3$ | $CH_3$ | $CH_3$ | H | $CH_2-C_6H_5$ |
| 23 | 5-$CH_3O_2C$ | H | H | $CH_3$ | $CH_3$ | $CH_3$ | H | $CH_2-C_6H_5$ |
| 24 | 5-Cl | H | H | $CH_3$ | $CH_3$ | $CH_3$ | H | $CH_2-C_6H_5$ |
| 25 | H | H | H | $CH_3$ | $CH_3$ | $CH_3$ | CN | $CH_2-C_6H_5$ |
| 26 | 5-$CH_3O$ | H | H | $CH_3$ | $CH_3$ | $CH_3$ | CN | $CH_2-C_6H_5$ |
| 27 | 5-$CH_3O_2C$ | H | H | $CH_3$ | $CH_3$ | $CH_3$ | CN | $CH_2-C_6H_5$ |
| 28 | 5-Cl | H | H | $CH_3$ | $CH_3$ | $CH_3$ | CN | $CH_2-C_6H_5$ |
| 29 | H | H | H | $CH_3$ | $CH_3$ | $CH_3$ | H | 4-chlorobenzyl |
| 30 | 5-$CH_3O$ | H | H | $CH_3$ | $CH_3$ | $CH_3$ | H | " |
| 31 | 5-$CH_3O_2C$ | H | H | $CH_3$ | $CH_3$ | $CH_3$ | H | " |
| 32 | 5-Cl | H | H | $CH_3$ | $CH_3$ | $CH_3$ | H | " |
| 33 | H | H | H | $CH_3$ | $CH_3$ | $CH_3$ | H | 2-chlorobenzyl |
| 34 | 5-$CH_3O$ | H | H | $CH_3$ | $CH_3$ | $CH_3$ | H | " |

TABLE 2-continued

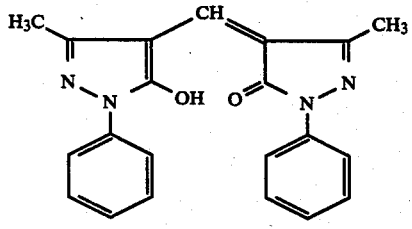

| Compound | L | M | Q | R' | $R_1'$ | $R_2'$ | $R_3'$ | $R_6'$ |
|---|---|---|---|---|---|---|---|---|
| 35 | 5-CH$_3$O$_2$C | H | H | CH$_3$ | CH$_3$ | CH$_3$ | H | " |
| 36 | 5-Cl | H | H | CH$_3$ | CH$_3$ | CH$_3$ | H | " |

In the process according to the invention, it is also possible to employ mixtures of various dyestuffs of the formula I and/or mixtures of dyestuffs of the formula I with other dyestuffs and/or inorganic or organic pigments.

The following may be mentioned as examples of suitable thermoplastics: cellulose esters, such as cellulose nitrate, cellulose acetate, cellulose triacetate, cellulose acetobutyrate and cellulose propionate, cellulose ethers, such as methylcellulose, ethylcellulose, and benzylcellulose, polyethylene terephthalate, linear saturated polyester resin plastics, polyamides, aniline resin plastics, polycarbonates, polyethylene, polypropylene, polystyrene, polyvinylcarbazole, polyvinylchloride, in particular rigid PVC, polyisobutylene, polymethacrylates, polyvinylidenechloride, polytetrafluoroethylene, polytrifluoroethylene, polyacrylonitrile, polyoxomethylenes, linear polyurethanes, polyphenylene oxide, polysulphones and copolymers, such as vinyl chloride/vinyl acetate copolymers and in particular styrene copolymers, such as acrylonitrile/butadiene/styrene copolymers (ABS), styrene/acrylonitrile copolymers (SAN), styrene/butadiene copolymers (SB) and styrene/α-methylstyrene copolymers (SMS).

The new process is particularly suitable for mass-dyeing polystyrene and styrene copolymers, in particular ABS.

The dyeings obtained are distinguished by good light fastnesses and weathering fastnesses. Surprisingly, the dyestuffs according to the invention possess, in the thermoplastics, extremely high thermal stabilities and stabilities to sublimation.

In U.S. Pat. No. 2,840,443, methine dyestuffs, for example of the formula

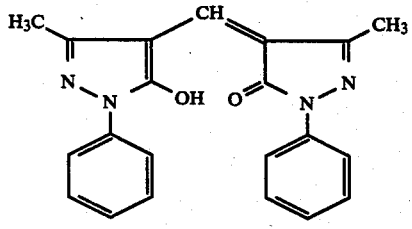

are proposed for dyeing synthetic, polymeric, thermoplastic materials. In comparison to these dyestuffs, the dyestuffs to be used according to the invention are distinguished by substantially higher thermal stabilities. This is of critical importance in the industrial processing. This advantage could not be foreseen on the basis of the prior art, and is accordingly to be regarded as surprising.

EXAMPLE 1

0.1 part by weight of the dyestuff of the formula

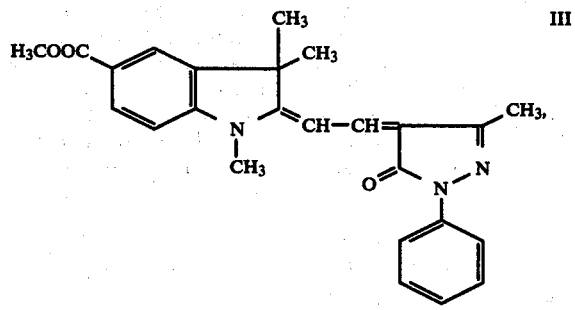

2 parts by weight of titanium dioxide (Bayertitan R-FK-D) and 100 parts by weight of polystyrene granules are mixed on a roller stand for 2 hours, in a closed vessel. The mixture obtained is extruded at approx. 230° C. to give extrudates of 2 cm width, and these are again granulated. The granules are injection moulded at 230°-240° C. with the aid of an injection moulding machine to give mouldings. Mouldings which are dyed orange and have a high stability to light are obtained.

EXAMPLE 2

0.05 part by weight of the dyestuff of the formula (III) and 100 parts by weight of polystyrene granules are mixed on a roller stand for 2 hours, in a closed vessel. The mixture is then injection moulded at 230°-240° C. with the aid of an injection moulding machine to give mouldings. The transparent mouldings which are dyed orange-red have high light fastness.

EXAMPLE 3

If the dyestuff of the formula (III) is replaced by the dyestuff of the formula

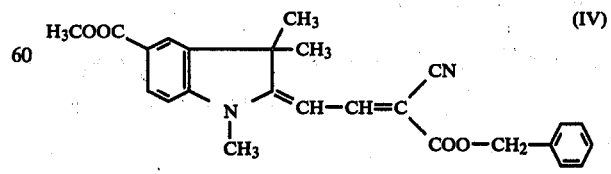

and the procedure described in Example 1 is otherwise followed, mouldings which are dyed greenish-yellow and have high light fastness are obtained.

EXAMPLE 4

If 0.05 part by weight of the dyestuff of the formula (IV) and 100 parts by weight of polystyrene granules are mixed, and the procedure described in Example 2 is otherwise followed, mouldings which are dyed greenish-yellow and have high light fastness are obtained.

EXAMPLE 5

If the polystyrene granules are replaced by ABS granules and the procedure described in Example 1 is otherwise followed, mouldings which are dyed orange and have high light fastness are obtained. The dyestuff of the formula (III) can be employed in ABS even at temperatures above 280° C. without noticeable changes in shade occurring or it being possible to detect sublimation.

EXAMPLE 6

If 0.1 part by weight of the dyestuff of the formula (IV), 2 parts by weight of titanium dioxide (Bayertitan R-FK-D) and 100 parts by weight of ABS granules are mixed, and the procedure described in Example 1 is otherwise followed, mouldings which are dyed greenish-yellow and have high light fastness are obtained.

The dyestuff of the formula (IV) can be employed in ABS even at temperatures above 280° C. without noticeable changes in shade occurring or it being possible to detect sublimation.

EXAMPLE 7

If the dyestuff of the formula (III) is replaced by a compound of the formula

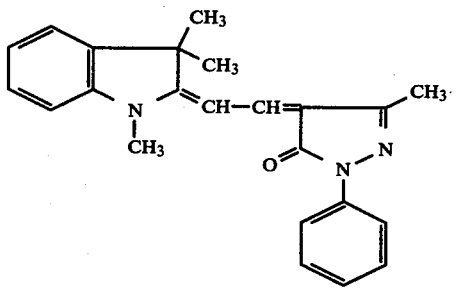

and the procedures described in Examples 1 and 2 are otherwise followed, opaque or transparent mouldings which are dyed orange and have high light fastness are obtained.

EXAMPLE 8

If, instead of the dyestuff of the formula (III), the dyestuff of the formula

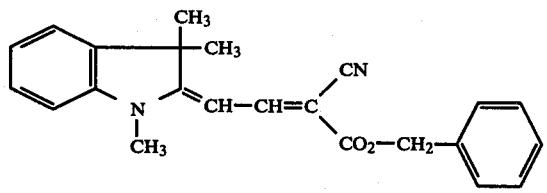

is used and the procedures described in Examples 1 and 2 are otherwise followed, opaque or transparent mouldings which are dyed greenish-yellow and have high light fastness are obtained.

I claim:

1. Process for mass-dyeing of polystyrene and styrene copolymers, characterised in that the dyestuffs used are of the formula

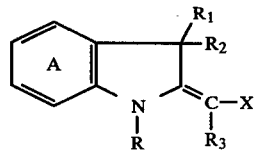

in which

X designates a radical

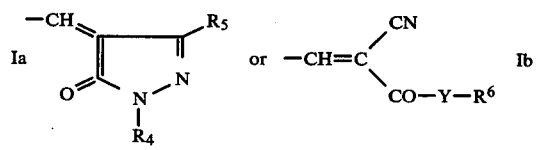

$R$ designates hydrogen or alkyl, $R_1$ and $R_2$ designate alkyl, $R_3$ designates hydrogen, cyano, aroyl, alkoxycarbonyl, alkylcarbonyl or carbamoyl, $R_4$ designates aryl, $R_5$ designates alkyl, alkylcarbonyl, alkoxycarbonyl or aryl, $R_6$ designates alkyl, aryl, aralkyl or aralkenyl, and Y designates O or $NR_7$, with $R_7$ having the meaning hydrogen, alkyl, aralkyl or aryl, it being possible for the radicals which have been mentioned for $R_7$ and $R_1$-$R_7$ and which contain C—H or N—H bonds to be substituted, and wherein the ring A can carry 1, 2 or 3 substituents from the series comprising halogen, cyano, alkyl, alkoxy, alkylcarbonyl, alkoxycarbonyl, aralkoxycarbonyl, carbamoyl, sulphamoyl, alkylsulphonyl and arylsulphonyl, or can have a benzene ring fused to it, it being possible for the radicals which have been mentioned as substituents of the ring A and which contain C—H or N—H bonds to be substituted.

2. Process according to claim 1, characterised in that compounds of the formula

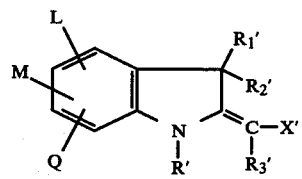

are used, in which

X' represents

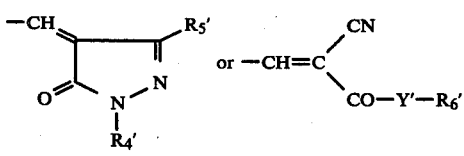

and

R' designates hydrogen, methyl or ethyl, $R_1'$ and $R_2'$ designate methyl or ethyl, $R_3'$ designates hydrogen, cyano, aroyl, in particular benzoyl and naphthoyl, alkoxycarbonyl, in particular ($C_1$–$C_4$-alkoxy)-carbonyl or carbamoyl, $R_4'$ designates phenyl which can be substituted by methyl, ethyl, methoxy, ethoxy or chlorine, $R_5'$ designates methyl, methoxycarbonyl or ethoxycarbonyl, or phenyl which can be substituted by methyl and/or ethyl, $R_6'$ designates $C_1$–$C_4$-alkyl, phenyl, chlorophenyl or methylphenyl, or phenyl-$C_1$–$C_3$-alkyl which can be substituted in the phenyl nucleus by chlorine and/or methyl, or designates phenylallyl or phenoxyethyl, $Y'$ designates O or $NR_7'$, wherein $R_7'$ represents alkyl, in particular $C_1$–$C_4$-alkyl, or aralkyl, in particular phenyl-$C_1$–$C_3$-alkyl, L designates hydrogen, chlorine, cyano, methyl, ethyl, methoxy, ethoxy, methoxycarbonyl, ethoxycarbonyl or benzyloxycarbonyl, or sulphamoyl or carbamoyl which is optionally substituted by methyl, ethyl or phenyl, or designates methylsulphonyl or phenylsulphonyl, and M and Q designate hydrogen, methyl, ethyl, methoxy, ethoxy, chlorine or methoxycarbonyl, and two of the substituents L, M and Q together can form a fused benzene ring.

3. Process according to claim 1, characterised in that compounds of the formula II are used, in which R' designates hydrogen or methyl, $R_1'$ and $R_2'$ designate methyl, $R_3'$ designates hydrogen, cyano or benzoyl, $R_4'$ designates phenyl which can be substituted by methyl, methoxy and/or chlorine, $R_5'$ designates methyl or methoxycarbonyl, L designates hydrogen, methoxycarbonyl, cyano, methoxy or chlorine, M and Q designate hydrogen, Y' designates O, and $R_6'$ designates $C_1$–$C_4$-alkyl, phenyl, chlorophenyl or methylphenyl, or phenyl-$C_1$–$C_3$-alkyl, the phenyl radical of which can be substituted by chlorine or methyl, or designates phenoxyethyl.

4. Process according to claim 1, characterised in that the dyestuff of the formula

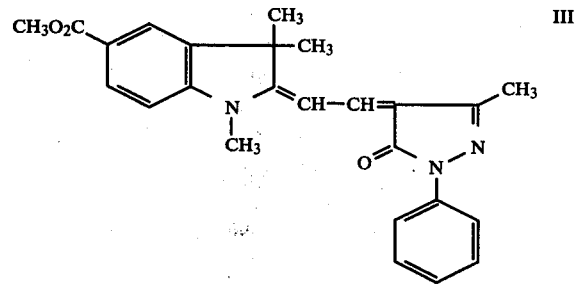

is used.

5. Process according to claim 1, characterised in that the dyestuff of the formula

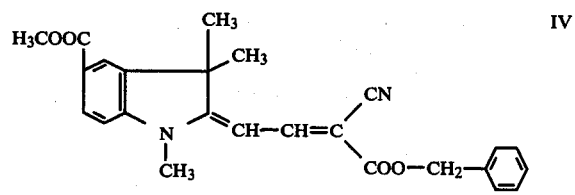

is used.

6. Process according to claim 1, for dyeing polystyrene.

7. Process according to claim 1, for dyeing polystyrene copolymers.

8. Process according to claim 1, for dyeing ABS.

* * * * *